United States Patent
Valligny et al.

(12) 
(10) Patent No.: US 6,896,962 B1
(45) Date of Patent: May 24, 2005

(54) OUTER COVERING FOR THE INSIDE PANEL OF A VEHICLE INCLUDING A DEVICE FOR ACCOMODATING A SAFETY AIR CUSHION

(75) Inventors: Dominique Valligny, Lille (FR); Benoît Menard, Lille (FR)

(73) Assignee: Visteon Systemes Interieurs, La Defence (FR)

( * ) Notice: Subject to any disclaimer, the term of this patent is extended or adjusted under 35 U.S.C. 154(b) by 0 days.

(21) Appl. No.: 10/048,826

(22) PCT Filed: Aug. 1, 2000

(86) PCT No.: PCT/FR00/02209

§ 371 (c)(1),
(2), (4) Date: Apr. 30, 2002

(87) PCT Pub. No.: WO01/08934

PCT Pub. Date: Feb. 8, 2001

(30) Foreign Application Priority Data

Aug. 2, 1999 (FR) .............................. 99 10158

(51) Int. Cl.$^7$ .............................. B32B 5/16; B32B 27/00
(52) U.S. Cl. ........................ 428/332; 428/338; 428/339; 428/500; 428/523
(58) Field of Search ................................ 428/332, 338, 428/339, 500, 523

(56) References Cited

U.S. PATENT DOCUMENTS 5,344,183 A 9/1994 Hersman et al. ............ 280/728

6,218,474 B1 * 4/2001 Valligny et al. ............ 525/194

FOREIGN PATENT DOCUMENTS

| EP | 96943150.1 | 12/1996 |
| GB | 2 277 908 | 11/1994 |
| JP | 10 273001 | 10/1998 |
| WO | WO 97/22665 | * 6/1997 |

OTHER PUBLICATIONS

Patent Abstracts of Japan vol. 199, No. 1 (Jan. 29, 1999).

* cited by examiner

*Primary Examiner*—Monique R. Jackson
(74) *Attorney, Agent, or Firm*—McCarter & English, LLP

(57) ABSTRACT

An outer covering for the inside panel of a vehicle, whereby said panel includes a device for the accommodation and deployment of a safety air cushion, comprising the following: a support which includes a device for the accommodation and deployment of a safety air cushion; an inner layer consisting of a thermoplastic or thermosetting polymer foam material covering said support and fixed thereto; an outer covering or skin made from a thermoplastic polymer material covering the inner layer and fixed thereto. The inventive covering is characterized in that it does not have any incipient ruptures on the part of the panel which is used to accommodate and deploy the safety air cushion; it is made of a thermoplastic polymer material in the form of a powder by means of a free flow and means of molding in a hot mold; the chemical composition is indicated for the entire panel and is obtained from a thermoplastic elastomer composition.

21 Claims, No Drawings

OUTER COVERING FOR THE INSIDE PANEL OF A VEHICLE INCLUDING A DEVICE FOR ACCOMODATING A SAFETY AIR CUSHION

The present invention relates to a skin for an interior vehicle panel, this panel including a part for housing an airbag, this panel comprising, in succession:
- a support or insert which includes a cover and a device for housing and deploying the airbag;
- an internal layer which consists of a thermoplastic or thermosetting polymer foam, covering said support, and is fastened to the support; and
- an external layer or skin, made of a thermoplastic polymer, covering said internal layer which is fastened to this layer.

Such a panel is more particularly intended to be used as a dashboard, a door panel or a seat backrest.

It is common practice to provide in the skin a region of weakness or of lower strength, intended to open easily when the airbag deploys as a result of the vehicle undergoing an impact. The region of lower strength is generally in the form of a fracture line and is usually obtained by thinning the internal side of the skin, for example using a hot knife, or aligned fracture initiators, by means of a laser.

The skin prescoring processes require very precise and complex operations to regulate and control the thickness of the thinned skin, so as to prevent excessive reduction and skin embrittlement. Long term, under the repeated effect of the thermal variations to which the passenger compartment of a vehicle is subjected, the skin may lose its flexibility and become brittle, particularly along the fracture line.

Now, for psychological reasons, it is desirable for a passenger not to be aware of the region of lower strength corresponding to the airbag. Furthermore, this region of lower strength must be able, in the long term, to retain, despite the temperature variations in the passenger compartment of the vehicle, a decorative interior appearance (soft and pliant surface) and mechanical properties which are high enough for it not to be impaired, especially not to deform and stretch, or even split.

Known from the prior art is British patent application GB 2 277 908. This application discloses an interior vehicle panel which includes a part for housing an airbag. In that invention, the skin is a blend of thermoplastics having a low hot strength; this drawback may result in scrap during manufacture.

Also known, from Japanese patent application No. 10-273001, is a method of producing an interior vehicle panel with a covering over the housing for an airbag, formed by injection molding. This method of production is relatively lengthy and requires the presence of injection molding "sprues", increases the loss of material and necessitates a finishing operation on the molded parts.

The Applicant has now developed a simplified structure of an interior vehicle panel comprising an external layer or skin free of fracture initiators lying within that part of the panel used for housing the airbag, these fracture initiators lying within that part of the panel used for housing the airbag, these fracture initiators possibly being in the form of a fracture line, by cutting the skin partially or at discrete points, or else by locally thinning the skin along one or more lines.

More specifically, the invention relates to a skin for an interior vehicle panel including a device for housing and deploying an airbag and comprising, in succession:
- a support which includes a device for housing and deploying the airbag,
- an internal layer which consists of a thermoplastic polymer foam, covering the support and fastened to the latter,
- an external layer or skin, made of a thermoplastic polymer, covering the internal layer and fastened to the latter, the skin being characterized in that:
  - it does not have fracture initiators in that part of the panel used for housing and deploying the airbag;
  - its thickness, over the entire panel, varies from 0.2 mm to 5 mm, preferably from 0.6 mm to 1.7 mm, and more preferably from 0.8 mm to 1.4 mm;
  - it is manufactured from a thermoplastic polymer, in the form of a powder, by powder slush molding;
  - its chemical composition is identical over the entire panel and is obtained from a thermoplastic elastomer composition predominantly comprising a blend of:
    - at least one propylene homopolymer; and/or at least one copolymer essentially based on propylene and based on at least one other olefin (ethylene or alpha-olefin other than propylene, for example butene); and/or at least one copolymer essentially based on ethylene and based on at least one alpha-olefin; and
    - at least one at least partially crosslinked polyolefin elastomer; and
  - optionally, a mineral or organic oil.

Preferably, the essentially propylene-based copolymer contains at least 50 mol % propylene, and the essentially ethylene-based copolymer contains at least 50 mol % ethylene.

By virtue of the invention, the manufacture of an interior vehicle panel intended to be combined with an airbag system does not require the skin to be pretreated, provided that the conditions indicated in claim 1 are met.

The thickness of the skin may be smaller over the major portion of the panel surface located above the airbag.

In accordance with an advantageous variant of the present invention, the thickness of the skin is more or less the same over the entire panel.

According to the invention, the skin for an interior vehicle panel may be easily torn off when the airbag starts to inflate, but has sufficient mechanical strength to allow it to be demolded without damage during manufacture using the slush molding technique and during normal use in the passenger compartment of an automobile.

The technique of manufacturing the skin from a powder is called slush molding. A description of this technique will be found, for example, in European patent application No. 96943150.1 and in United States patent US-005344183A.

The thermoplastic polymer used to manufacture the skin may be a powder composition comprising at least one polypropylene or an essentially propylene-based copolymer, at least one at least partially crosslinked polyolefin elastomer and a mineral oil as flexibilizer.

According to a preferred variant of the invention, the skin is manufactured from a thermoplastic polymer consisting of an alloy of particular polyolefins, in the form of a powder, by slush molding, preferably at a temperature varying from 220° C. to 350° C. This alloy of particular polyolefins comprises:
- a) about 97 to about 20 parts by weight of a matrix composed of at least one polymer containing at least 50 mol % polypropylene and, dispersed in this matrix, at least one at least partially crosslinked polyolefin elastomer;
- b) about 3 to about 80 parts by weight of at least one polymer containing at least 50 mol % ethylene;
- c) optionally, at least one internal demolding agent.

It is unnecessary to provide, in the aforementioned preferred thermoplastic polymer, a mineral or organic oil to promote melt flow and improve the flexibility of the molded skin.

The best results, associated with the aforementioned objectives, were obtained with a thermoplastic polymer which is an alloy:

a) of about 80 to about 50 parts by weight of a matrix composed of at least one polymer containing at least 50 mol % polypropylene and, dispersed in this matrix, at least one at least partially crosslinked polyolefin elastomer;

b) of about 20 to about 50 parts by weight of at least one polymer containing at least 50 mol % ethylene; and c) optionally, of at least one internal demolding agent.

The melt flow index (MFI), defined by the ASTM D1238 L standard (measured at 230° C. and 2.16 kg), of the matrix (a) is advantageously between 5 and 100 g/10 minutes and better still between 25 and 70 g10 minutes.

The melt flow index of the matrix (a) corresponds approximately to the melt flow index of the thermoplastic polymer.

The polymer containing at least 50 mol % polypropylene, constituting the matrix (a) of one of the aforementioned thermoplastic polymer families, is preferably semicrystalline, that is to say its crystallinity, determined by differential thermal analysis (DTA or DSC), is at least 5%. The polymer may be chosen from the group comprising a semicrystalline polypropylene homopolymer, a semicrystalline propylene-ethylene copolymer, a blend of a semicrystalline propylene homopolymer and a semicrystalline propylene-ethylene copolymer, a polypropylene (homopolymer) having amorphous blocks and semicrystalline blocks and propylene-ethylene or alpha-olefin copolymers having amorphous blocks and semicrystalline blocks. Advantageously, the semicrystalline propylene-ethylene copolymer used to form the matrix (a) contains small amounts of ethylene, generally between 2% and 5% by weight, so that essential properties, such as ease of processing by a lowering of the melting point of the matrix, lack of whitening due to impact and rain, and ease of demolding parts with a reverse taper.

The at least partially crosslinked polyolefin elastomer helps to improve the impact strength of the skin at low temperature (down to −35° C.).

The at least partially crosslinked polyolefin elastomer dispersed in the matrix (a) is preferably semicrystalline, that is to say its crystallinity determined by differential thermal analysis is at least 5%. It may be chosen from thermoplastic elastomers:

used by themselves, such as: ethylene-propylene rubber (EPR), ethylene-propylene-diene monomer (EPDM), styrene-butadiene-styrene (SBS), styrene-ethylene-butadiene-styrene (SEBS) and styrene-butadiene rubber (SBR);

or used as a blend, either in a reactor or by extrusion, of polypropylene with at least one elastomer, such as for example propylene/ethylene-propylene rubber (PP/EPR) and propylene/ethylene-propylene-diene monomer (PP/EPDM), the elastomer fraction of which is at least partially crosslinked.

Advantageously, the components of the matrix (a) are subjected to a partial or complete crosslinking reaction by means of a suitable agent, such as a peroxide or a silane, or to chemical grafting by means of acrylic acid or methacrylic acid or maleic anhydride or alkyl acrylates or methacrylates in which the alkyl is a $C_1$–$C_8$ hydrocarbon chain.

The matrix may be prepared by introducing and mixing, in a reactor or in an extruder, at least one polymer containing at least 50 mol % propylene and at least one at least partially crosslinked polyolefin elastomer.

The polymer containing at least 50 mol % ethylene, forming component (b) of one of aforementioned thermoplastic polymer families, may be amorphous or semicrystalline. It is preferably semicrystalline, that is to say its crystallinity determined by differential thermal analysis is at least 5%. It may be chosen from the group comprising low-density polyethylene (LDPE), linear low-density polyethylene (LLDPE), a blend of low-density polyethylene (LDPE) and a high-density polyethylene (HDPE), this blend containing at most 50% HDPE, an ethylene/alpha-olefin copolymer, in which the alpha-olefin is a $C_3$–$C_{10}$ unit, and, more specifically, ethylene-octene copolymers (POE) containing 5 and 40 wt % octene, ethylene terephthalate (PET), ethylene-vinyl acetate (EVA), an ethylene-alkyl acrylate, an ethylene-alkyl methacrylate, in which the alkyl is a $C_1$–$C_8$ hydrocarbon chain optionally modified by maleic anhydride, an ethylene-tetrafluoroethylene copolymer and ethylene ionomers, neutralized or not. Preferably, the melting range of the polymer containing 50 mol % ethylene, of component (b), starts at most at 140° C.

Various additives of known type and commonly employed in compositions intended for the slush molding process may also be introduced when mixing the constituents of the matrix, or even subsequently, when preparing the thermoplastic polymer of the skin, by the processing of its various constituents (a), (b) and, optionally, (c).

These various additives are, for example, heat or photochemical stabilizers, lubricants (used in amounts very much less than those of the oils used to improve the flexibility), antistatic agents, fire retardants and antioxidants.

Pulverulent mineral materials may also be introduced into the thermoplastic polymers forming the skin according to the invention in an amount from 0.1 to 10 parts and preferably from 0.1 to 5 parts by weight per 100 parts by weight of components "a" and "b".

The dimensions of these mineral materials are generally between 0.01 and 300 μm and preferably between 0.1 and 100 μm.

However, within the context of the present invention it is preferable not to add, or to limit the amount of, certain additives:

which may make the slush molding process more difficult, such as pulverulent mineral materials; or which may bloom and result, long term, in a reduction of the mechanical properties of the skin, such as oils (or lubricants).

In the thermoplastic polymer corresponding to the preferred variant, the presence of pulverulent mineral materials used as fillers, such as talc, are preferably excluded. It is also preferable to exclude oils as flexibilizer.

According to the invention, the thermoplastic polymer of the skin may include at least one internal demolding agent.

The internal demolding agent may be chosen from one of the conventionally known agents belonging to the group comprising the family of montan and montan ester derivatives, stearate salts, amines, amides, hydrogenated hydrocarbon resins, polyolefin waxes, such as polyethylene waxes, polypropylene waxes and ethylene-propylene copolymer waxes, and resins formed by the copolymerization of aliphatic and/or aromatic monomers.

Preferably, the internal demolding agent may be chosen from the group formed by alkaline-earth metal stearates, the most commonly used of which is calcium stearate, and stearic acid amides ($C_{17}H_{35}$—$CONH_2$), such as ethylene bis(stearamide) (EBS) used by itself or as a mixture.

The internal demolding agent which, at the end of the day, is preferably used to manufacture the skin according to the invention is magnesium stearate.

The internal demolding agent may be introduced into the thermoplastic polymer matrix during a mixing operation, either when preparing the matrix forming component "a", or else when mixing said matrix with the ethylene-based polymer forming component "b".

The internal demolding agent is introduced into the composition preferably in an amount from 0.1 to 12 parts by weight and very preferably in an amount from 0.5 to 10 parts by weight per 100 by weight of components "a" and "b".

The powdered thermoplastic polymer used to manufacture the skin may be prepared by carrying out the following steps:

mixing the constituents of the thermoplastic polymer in an extrusion zone;

cryogenic grinding of the granules resulting from the extrusion, so as to reduce them to a powder.

Preferably, the powdered thermoplastic polymer used to manufacture the skin is prepared by microgranulation, which consists of extrusion through a microdie and die-face cutting in an aqueous medium, resulting in a thermoplastic polyolefin powder consisting of almost spherical particles, or microbeads.

The thermoplastic polyolefin powder suitable for the invention, obtained by an appropriate process such as, for example, those mentioned above, has a particle size varying from 0.01 to 2000 $\mu$m, preferably ranging from 100 $\mu$m to 1000 $\mu$m.

To promote the optimum flow of the powder over the mold during the manufacture of the skin, and thus avoid local areas of excess material, whatever the shape of the mold, and to achieve the small skin thicknesses intended within the context of the invention, it is preferable to introduce, into the thermoplastic polymer, at least one flow agent, such as a precipitated silica or an alumina, possibly grafted by a silicone or by a silicone oil.

The amount of flow agent which may be provided in the thermoplastic polymer according to the invention is between 0.01 and 10 parts, preferably between 0.01 and 5 parts, by weight per 100 parts of components (a) and (b) of the material.

Finally, other organic pulverulent materials of natural or synthetic origin may also be introduced, such as, for example, colorants, carbon black or a finely ground polypropylene wax. All these pulverulent materials may be used by themselves or as a combination and, optionally, may be introduced during the extrusion before granulation (compounding).

In general, the amount of organic pulverulent material which may be provided in the thermoplastic polymer according to the invention preferably does not exceed 6 parts per 100 parts of components (a) and (b) of the material.

The thermoplastic polymers forming the skin according to the invention may be prepared in a reactor or by extrusion or by powder—powder blending. They may furthermore be subjected to a partial crosslinking operation, preferably using a peroxide or a silane, or to a grafting reaction using acrylic acid, methacrylic acid, maleic anhydride or alkyl acrylates or methacrylates in which the alkyl is a $C_1$–$C_8$ hydrocarbon chain.

As indicated above, the skin according to the invention is intended for an interior vehicle panel, which includes a device for housing and deploying an airbag.

Such a panel therefore comprises, in succession:

a support or insert, which includes a device for housing and deploying an airbag. Within the context of the present invention, the device may be of any sort. In particular, the cover provided in the support, designed to open under the pressure of the airbag when it inflates, may or may not include means for cutting the internal layer consisting of a thermoplastic polymer foam and the external layer or skin;

covering the support and fastened to it, an internal layer consisting of a thermoplastic or thermosetting polymer foam, preferably made of polyurethane or polypropylene. This internal layer may or may not include a fracture line corresponding to the opening of the support during deployment of the airbag. The thickness of this internal foam layer generally varies from 1 to 20 mm, preferably from 5 to 15 mm. Its density generally varies from 20 to 500 g/l; and covering this internal layer and fastened to it, a skin according to the invention.

An interior vehicle panel according to the invention may be produced as follows:

1) the skin is manufactured by the slush molding technique;
2) the skin is fastened to the support by means of an internal layer of a thermoplastic or thermosetting polymer foam by placing the skin and the support in a mold and by forming the internal foam layer inside this mold;
3) the resulting interior panel is demolded and subjected to possible finishing operations; and
4) optionally, the skin of the interior panel is lacquered.

The skin according to the invention allows the following performance characteristics to be achieved:

a decorative external appearance, in particular a pliant and soft feel;

whether painted or not, good resistance to heat, light, scratching, abrasion and chemicals, despite the temperature variations in the passenger compartment of the vehicle, subject to normal use, these properties being largely retained in the long term;

sufficient mechanical strength to allow the skin to be removed from the mold extremely easily and without being damaged, but with mechanical properties (elongation at break when hot (at about 90° C.) and when cold (at about −40° C.), yield point and tear strength) sufficiently limited to be able to open easily during inflation of the airbag in the event of collision against another vehicle or a hard object without scattering broken fragments of the interior panel. Thus, by virtue of the invention, the fracture and scattering of fragments of the interior panel because of deployment of the airbag are prevented. This is because it is known that broken and scattered fragments of the interior panel can injure passengers, especially when the vehicle just before the collision is running at high speed, and when the temperature of the panel is low; and the formation of an approximately straight opening in the skin at the point where the stress is highest when the support or insert opens during deployment of the airbag, under skin temperature conditions varying from −35° C. to +85° C.

More specifically, the performance characteristics achieved within the context of the invention are as follows:

tensile strength test: this test consists in applying a pull speed of 100 mm per minute (±10 mm per minute) along the length of a skin test specimen having dimensions of 150 mm×25 mm. Within the context of the present invention, the tensile strength of the skin generally varies from 0.5 to 80 newtons. The best tensile strength values obtained with an alloy of various polyolefin polymers lie within the range from 3 to 12 newtons. Again within the context of this tensile test, the elongation of the test specimen generally varies from 5 to 250%. The best elongation values obtained with an alloy of various polyolefin polymers lie within the range from 15 to 150%;

tear strength test: this test consists in applying a force at a speed of 100 mm per minute (±10 mm per minute) to a skin test specimen having dimensions of 200 mm×50 mm, with a straight fracture initiator 80 mm in length. Within the context of the present invention, the tear strength of the skin generally varies from 20 to 100 newtons. The best tear strength values obtained with an alloy of various polyolefin polymers lie within the range from 5 to 17 newtons.

What is claimed is:

1. A skin for an interior vehicle panel, the vehicle panel having a support means including a means for housing and deploying an air bag, and a thermoplastic foam internal layer, wherein the internal layer covers, and is fastened to the support means, and an external skin wherein the external skin covers, and is fastened to the internal layer, the skin comprising:

at least one propylene homopolymer; at least one copolymer based on propylene, and having at least one olefin; at least one copolymer based on ethylene, and having at least one alpha-olefin; at least one at least partially crosslinked polyolefin elastomer; and at least one of a mineral oil, an organic oil or a combination thereof;

said skin having substantially no fracture initiators in that part of the panel used for housing and deploying the airbag, and wherein the thickness of said skin, over the entire panel, is from about 0.2 mm to about 5 mm, and wherein the skin is manufactured by slush molding of a powder such that the chemical composition of said thermoplastic polymer is identical over the entire panel, and wherein said skin has a tensile strength of from about 0.5 Newton to about 80 Newton, an extension to breaking point of from about 5% to about 250%, and a resistance to tearing with an initial and straight breading of 80 mm of from about 20 Newton to about 100 Newton.

2. The skin for an interior vehicle panel as claimed in claim 1, wherein the thickness of the skin is from about 0.6 mm to about 1.7 mm over the entire panel.

3. The skin for an interior vehicle panel as claimed in claim 2, wherein the thickness of the skin is from about 0.8 mm to about 1.4 mm over the entire panel.

4. The skin for an interior vehicle panel as claimed in claim 1, characterized in that the thermoplastic polymer is in the form of a powder obtained by cryogenic grinding or in the form of a powder composed of microbeads obtained by extrusion through a microdie.

5. The skin for an interior vehicle panel as claimed in claim 1, wherein the thermoplastic polymer of the skin is based on:

(a) from about 97 to about 20 parts by weight of a matrix composed of at least one polymer containing at least 50 mol % polypropylene, and dispersed in this matrix at least one at least partially crosslinked polyolefin elastomer;

(b) from about 3 to about 80 parts by weight of at least one polymer containing at least 50 mol % ethylene; and (c) optionally, at least one internal demolding agent.

6. The skin as claimed in claim 5, wherein the thermoplastic polymer of the skin is based on:

(a) from about 80 to about 50 parts by weight of a matrix composed of at least one polymer containing at least 50 mol % polypropylene, and dispersed in this matrix at least one at least partially crosslinked polyolefin elastomer;

(b) from about 20 to about 50 parts by weight of at least one polymer containing at least 50 mol % ethylene; and (c) optionally, at least one internal demolding agent.

7. The skin as claimed in claim 5, characterized in that the matrix (a) has a melt flow index (MFI: ASTM D 1238L; 230° C./2.26 kg) of between 5 and 100 g/10 minutes.

8. The skin as claimed in claim 7, wherein the matrix "a" has a melt flow index (MFI: ASTM D 1238L; 230 C/2.16 kg) of from about 25 to about 70 g/1 0 minutes.

9. The skin as claimed in any one of claims 5 to 8, wherein the polymer containing at least 50 mol % propylene of the polymer matrix "a" is semicrystalline.

10. The skin as claimed in any one of claims 5 to 8, wherein the polymer containing at least 50 mol % propylene of the polymer matrix "a" is chosen from the group consisting of a semicrystalline polypropylene homopolymer, a semicrystalline propylene-ethylene copolymer; a blend of a semicrystalline polypropylene homopolymer, and a semicicrystalline propylene-ethylene copolymer; a polypropylene homopolymer having amorphous blocks, and semicrystalline blocks; and propylene-ethylene or alpha-olefin copolymers having amorphous blocks, and semicrystalline blocks.

11. The skin as claimed in any one of the claims 5 to 8, wherein the at least partially crosslinked polyolefin elastomer of the polymer matrix "a" is semicrystalline.

12. The skin as claimed in any one of claims 5 to 8, wherein the at least partially crosslinked polyolefin elastomer of the polymer matrix "a" is one of the elastomers belonging to the group consisting of ethylene-propylene rubber (EPR), ethylene-propylene-diene monomer (EPDM), styrene-butadiene-styrene (SBS), styrene-ethylene-butadiene-styrene (SEBS), and styrene-butadiene rubber (SBR).

13. The skin as claimed in any one of claims 5 to 8, wherein the at least partially crosslinked polyolefin elastomer of the polymer matrix "a" is a blend of polypropylene with at least one of the elastomers: ethylene-propylene rubber (EPR), and ethylene-propylene-diene monomer (EPDM).

14. The skin as claimed in any one of claims 5 to 8, wherein the components of the polymer matrix "a" are subjected to chemical grafting by means of acrylic acid, methacrylic acid, maleic anhydride, alkyl acrylates, methacrylates or combinations thereof in which the alkyl is a $C_1$–$C_8$ hydrocarbon chain.

15. The skin as claimed in any one of claims 5 to 8, wherein the components of the polymer matrix "a" are subjected to a partial or complete crosslinking reaction using a crosslinking agent chosen from the group consisting of peroxide, and silane.

16. The skin as claimed in any one of claims 5 to 8, wherein the polymer containing at least 50 mol % ethylene forming component "b" is semicrystalline.

17. The skin as claimed in any one of claims 5 to 8, wherein the polymer containing at least 50 mol % ethylene forming component "b" is chosen from the group consisting of a low density polyethylene (LDPE); a linear low density polyethylene (LLDPE); a blend of LDPE, and a high density polyethylene (HDPE), this blend containing from about 0% to about 50% HDPE; an ethylene alpha-olefin copolymer, wherein the alpha-olefin is a C3–C10 unit; an ethylene octene copolymers (POE), comprising from about 5% to about 40 wt % of octene; an ethylene terephthalate (PET); an ethylene vinyl acetate (EVA); an ethylene-alkyl acrylate; an ethylene-alkyl methacrylate, wherein the alkyl is a C1–C8 hydrocarbon chain or optionally modified by maleic anhydride; an ethylene tetrafluorothylene copolymer; ethylene ionomers, neutralized or not, and combinations thereof.

18. The skin as claimed in claims 5 to 8, wherein the melting range of the polymer containing at least 50 mol % ethylene of component "b" is substantially less than or equal to 140° C.

19. The skin as claimed in any one of claims 5 to 8, wherein the entire thermoplastic polymer material is subjected to a partial crosslinking operation.

20. The skin as claimed in claim 1, wherein the thermoplastic polymer comprises a tensile strength from about 3 Newton to about 12 Newton.

21. The skin as claimed in claim 1, wherein the thermoplastic polymer comprises an extension to breaking point of from about 15% to about 150%.

* * * * *